(12) United States Patent
Hawley et al.

(10) Patent No.: US 11,654,912 B2
(45) Date of Patent: May 23, 2023

(54) ENHANCED BOAT LAUNCHING AND LOADING DETECTION AND MANAGEMENT SYSTEM

(71) Applicant: Ford Global Technologies, LLC, Dearborn, MI (US)

(72) Inventors: Taylor Hawley, Oak Park, MI (US); Jeremy Lerner, Southfield, MI (US); Scott Huggins, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 17/219,280

(22) Filed: Mar. 31, 2021

(65) Prior Publication Data

US 2022/0314996 A1     Oct. 6, 2022

(51) Int. Cl.
| | |
|---|---|
| *G08G 1/123* | (2006.01) |
| *G08G 1/127* | (2006.01) |
| *G01C 21/00* | (2006.01) |
| *G08G 1/13* | (2006.01) |
| *G08G 1/137* | (2006.01) |
| *G08G 1/133* | (2006.01) |
| *B60W 30/18* | (2012.01) |
| *B60P 3/10* | (2006.01) |

(Continued)

(52) U.S. Cl.
CPC ..... *B60W 30/18036* (2013.01); *B60P 3/1075* (2013.01); *B62D 13/06* (2013.01); *G01C 21/3807* (2020.08); *G01C 21/3811* (2020.08); *G08G 1/123* (2013.01); *G08G 1/127* (2013.01); *G08G 1/13* (2013.01); *G08G 1/133* (2013.01); *G08G 1/137* (2013.01); *B60W 2050/146* (2013.01); *B60W 2300/14* (2013.01); *B60W 2420/42* (2013.01)

(58) Field of Classification Search
None
See application file for complete search history.

(56) References Cited

U.S. PATENT DOCUMENTS

| | | | |
|---|---|---|---|
| 8,868,302 B2 * | 10/2014 | Everett | G05D 1/0291 701/410 |
| 2014/0107971 A1 | 4/2014 | Engedal et al. | |
| 2015/0217693 A1 | 8/2015 | Pliefke et al. | |

(Continued)

OTHER PUBLICATIONS

Advantage Ford, "How Does Fords Pro-Trailer Backup Assist Work?", https://www.advantageford.ca/blog/fords-pro-trailer-backup-assist-work/, Jul. 31, 2019, 3 pages.

(Continued)

*Primary Examiner* — Todd Melton
(74) *Attorney, Agent, or Firm* — Brandon Hicks; Eversheds Sutherland (US) LLP (57) ABSTRACT

Devices, systems, and methods for boat launching and loading detection and management are disclosed herein. A method may include receiving, by a first device, data associated with operation of a vehicle. The method may include determining, based on the data, that the operation of the vehicle includes at least one of launching a boat into water using the vehicle or loading the boat onto the vehicle. The method may include generating map data indicative of a location associated with the operation of the vehicle. The method may include sending the map data to a second device for presentation.

20 Claims, 4 Drawing Sheets

(51) Int. Cl.
    *B62D 13/06*     (2006.01)
    *B60W 50/14*     (2020.01)

(56) References Cited

U.S. PATENT DOCUMENTS

| | | |
|---|---|---|
| 2019/0275941 A1 | 9/2019 | Lu et al. |
| 2021/0387704 A1* | 12/2021 | Ramage ................. B63B 49/00 |
| 2022/0113155 A1* | 4/2022 | Günzel ................. G08G 1/056 |

OTHER PUBLICATIONS

Ford Media Center, "All New ProTrailer Backup Assist for 2016 Ford F-150 Makes Backing Up and Parking a Trailer Easier than Ever", Ford Media Center, May 21, 2015, 2 pages.

* cited by examiner

ENHANCED BOAT LAUNCHING AND LOADING DETECTION AND MANAGEMENT SYSTEM

BACKGROUND

People who use boats often lack information regarding available locations for recreational boat launches. For example, some people may be unaware of locations at which they may launch a boat into water.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

People may use vehicles to load and launch boats. For example, a vehicle may load a boat (e.g., using a trailer, tow hitch, etc.) and drive boats to water for boat launching. A vehicle may back (e.g., reverse) into water to load a boat.

However, people often are unaware of locations that permit boat launching.

There is therefore a need for a boat launching and loading detection and management system.

In one or more embodiments, data may indicate whether a vehicle is loading or launching a boat. Based on that data, other vehicles and devices may be notified of the locations at which vehicles are loading or launching boats. For example, vehicle gear data may indicate whether a vehicle shifts from drive to reverse (e.g., to back into water to launch a boat). The use of vehicle programming (e.g., back-up assist modes, etc.) may indicate that a vehicle is loading or launching a boat. Location data may indicate whether a vehicle is loading or launching a boat (e.g., based on whether a vehicle is near a body of water). Tow weight of a vehicle may indicate whether a vehicle is loading or launching a boat (e.g., based on whether the boat is being towed by the vehicle). Image data (e.g., from a vehicle camera or other camera) may indicate whether a vehicle is loading or launching a boat (e.g., based on whether captured image data indicates the presence of a boat behind the vehicle, whether the boat is at an inclined angle indicating that the vehicle is backing into water, etc.).

In one or more embodiments, with user consent and in accordance with relevant laws, devices may collect data from vehicles, such as location data, vehicle gear data, vehicle mode data, vehicle image data, vehicle weight data, and the like, to determine whether one or more vehicles are loading or launching boats and at which locations. The devices may identify boat launching locations based on determinations that vehicles are launching or loading boats and the locations where the data are detected. The devices may generate map data indicating locations where vehicles may launch and load boats, expected launch and load wait times (e.g., based on the number of vehicles at or near a launch and load location, etc.), and driving directions to a launch and load location (e.g., from a vehicle's current location).

Illustrative Embodiments

Figure 1:
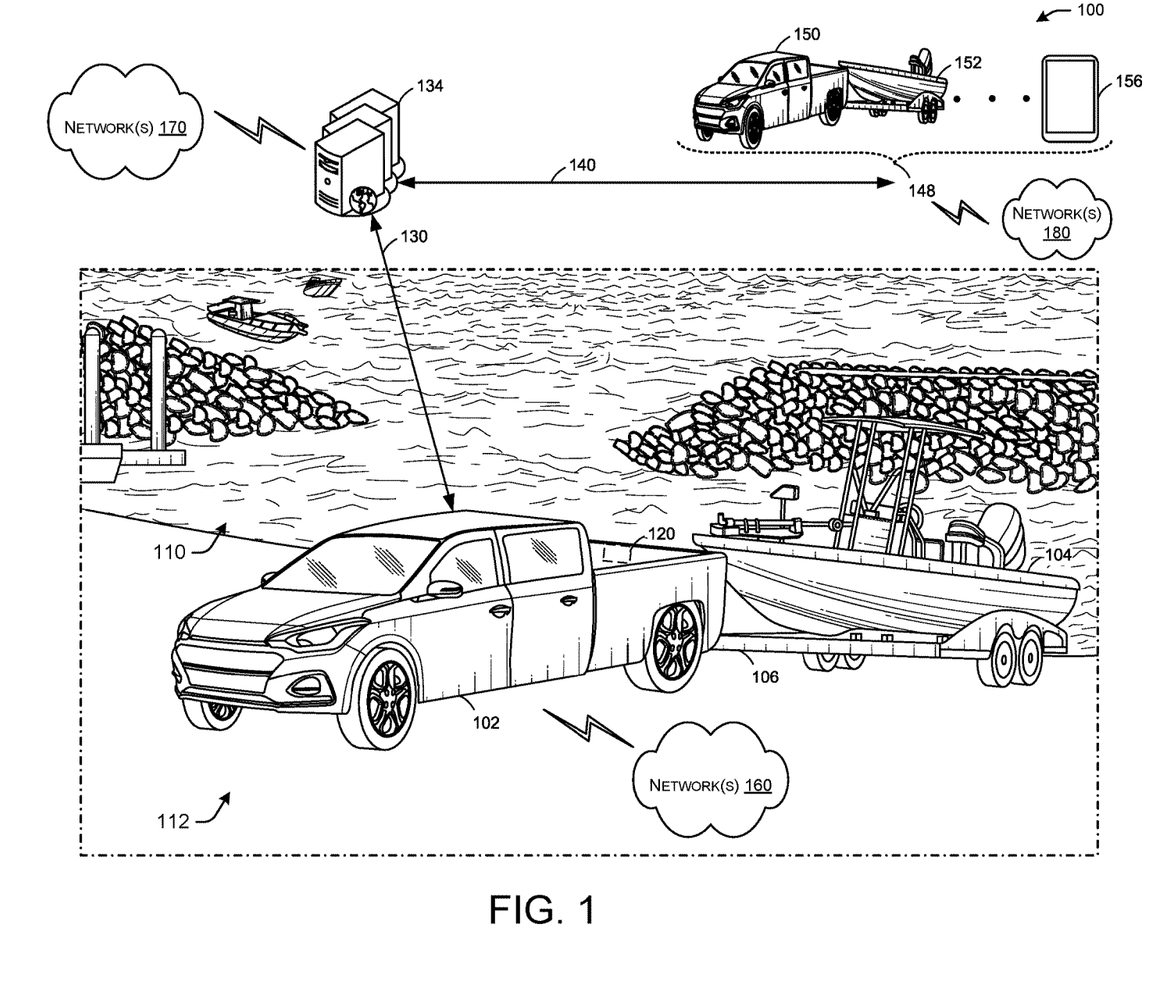
FIG. 1 depicts an illustrative system for boat launching and loading detection and management in which techniques and structures for providing the systems and methods disclosed herein may be implemented.

Turning now to the drawings, FIG. 1 depicts an illustrative system 100 for boat launching and loading detection and management in which techniques and structures for providing the systems and methods disclosed herein may be implemented.

Referring to FIG. 1, the system 100 may include a vehicle 102 with a boat 104 (e.g., attached using a trailer 106) to load or launch the boat 104 into a body of water 110 at a location 112 (e.g., a boat ramp, etc.). The vehicle 102 may have one or more sensors 120 (e.g., cameras, LIDAR, and the like) that may capture data (e.g., indicating whether the boat 104 is behind the vehicle 102). The vehicle 102 may provide data 130 to a remote device 134 (e.g., a remote server). The data 130 may include location data (e.g., global navigation satellite system data, global positioning data, etc.), vehicle gear data, vehicle mode data, vehicle image data, vehicle weight data, and the like.

Still referring to FIG. 1, the remote device 134 may analyze the data 130 to determine whether the vehicle 102 is loading or launching the boat 104, the location 112, and whether any other nearby vehicles are launching boats. The data 130 may include vehicle gear data, such as whether the vehicle 102 is in drive or reverse, or whether the vehicle 102 has shifted from drive to reverse at the location 112. A shift from drive to reverse may indicate that the vehicle 102 is launching the boat 104 into the body of water 110. The data 130 may include vehicle mode data, such as a back-up assist mode used by the vehicle 102 to launch the boat 104 into the body of water 110. When the data 130 indicates that the vehicle 102 is using a back-up assist mode at the location 112 (e.g., a location at or near the body of water 110), such may indicate that the vehicle 102 is launching the boat 104 into the body of water 110. When the data 130 include image data (e.g., images detected by the one or more sensors 120), the remote device 134 may use image analysis techniques (e.g., computer vision, machine learning, etc. to match image data to classified objects based on object matching and/or trained machine learning with objects classified as boats, for example) to identify the boat 104 and the body of water 110. In particular, the remote device 134 may determine from image data whether the boat 104 is present and/or whether the boat 104 is at an angle indicating that the boat 104 is being launched into the body of water 110. When the data 130 include vehicle weight data, the weight data may indicate a weight applied to trailer 106 or other portion of the vehicle 102, indicating that the vehicle 102 is driving the boat 104. Any combination of the different types of the data 130 may be used together to verify that the vehicle 102 is driving the boat 104 at the location 112.

Still referring to FIG. 1, the remote device 134 may generate and send map data 140 to one or more devices 148 (e.g., a device of a vehicle 150 driving a boat 152, a user device 156, etc.) to indicate presence of other vehicles launching or loading boats (e.g., the vehicle 102 and the boat 104), the location of the other vehicles launching or loading boats (e.g., the location 112), directions from the one or more devices 148 to the location of the other vehicles launching or loading boats, wait times at the location of the other vehicles launching or loading boats (e.g., based on a number of vehicles detected at a location, etc.), and the like. The map data 140 may be presentable using the one or more devices 148.

In one or more embodiments, the remote device 134 and/or the one or more devices 148 may include a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, or the like.

Any of the vehicle 102, the remote device 134, and/or the one or more devices 148 may be configured to communicate with each other via one or more communications networks 160, 170, and/or 180 wirelessly or wired. Any of the communications networks 160, 170, and/or 180 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 160, 170, and/or 180 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 160, 170, and/or 180 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 2:
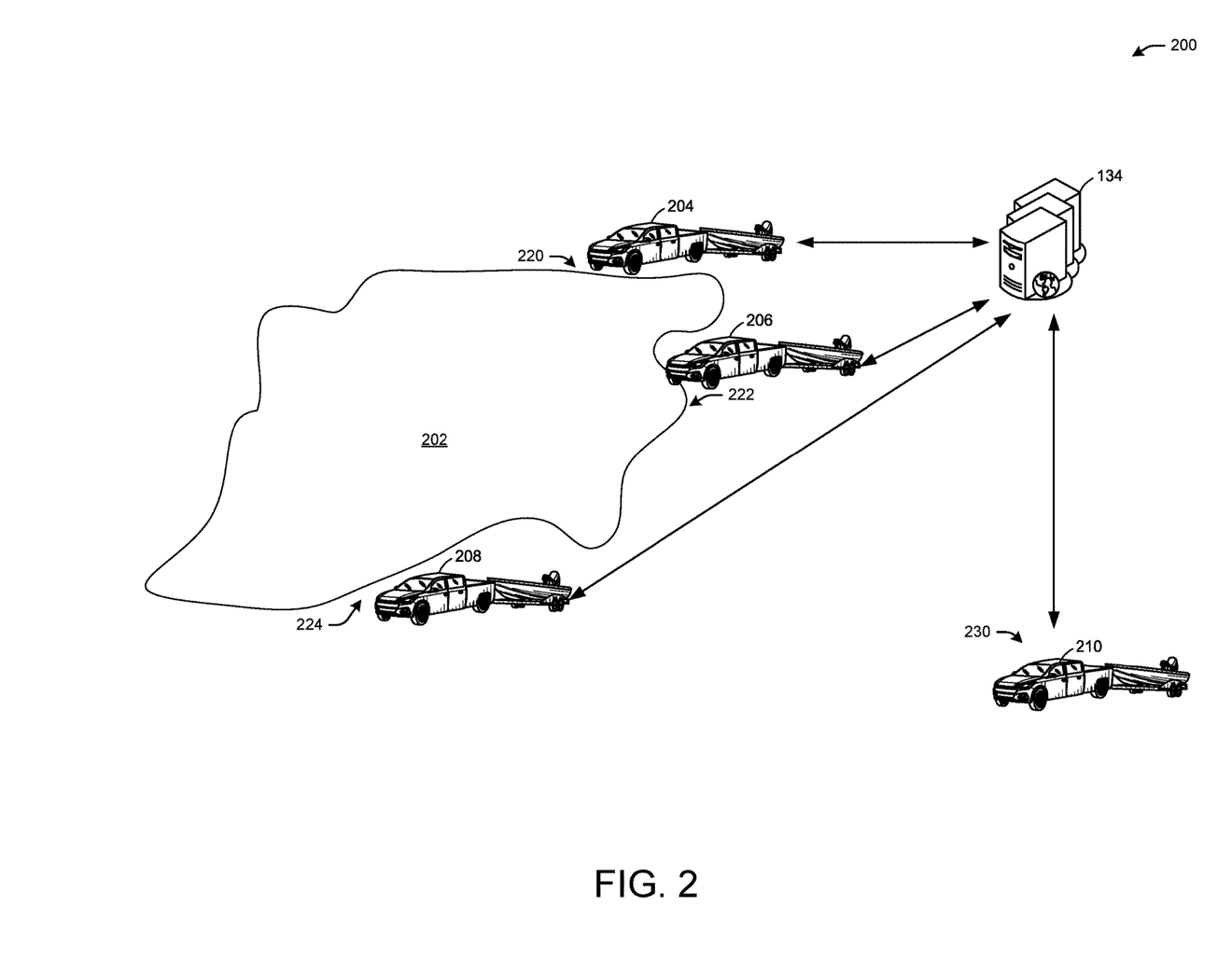
FIG. 2 depicts an illustrative presentation of data for boat launching and loading detection and management.

FIG. 2 depicts an illustrative presentation of data 200 for boat launching and loading detection and management.

Referring to FIG. 2, the data 200 may include a body of water 202 and locations of vehicles with boats (e.g., a vehicle 204, a vehicle 206, a vehicle 208, a vehicle 210). The data 200 may represent the data 130 and/or the map data 140 of FIG. 1. For example, the vehicles 204-210 may provide data (e.g., the data 130 of FIG. 1) to the remote device 134 of FIG. 1 to determine whether any of the vehicles 204-210 are loading or launching boats, and at which locations at the body of water 202. For example, the vehicle 204 may be loading or launching a boat at location 220 as indicated by the data 200. The vehicle 206 may be loading or launching a boat at location 222 as indicated by the data 200. The vehicle 208 may be loading or launching a boat at location 224 as indicated by the data 200. The data 200 may be provided to the vehicle 210, at location 230, to allow the vehicle 210 to identify locations where the vehicle 210 may launch a boat (e.g., based on where the vehicles 204-208 have launched boats). In this manner, the body of water 202 and the boat launching locations (e.g., the locations 220-224) may be indicated as map data as shown in FIG. 2, and may include driving directions to the boat launching locations.

In one or more embodiments, the data 200 may indicate whether a vehicle is loading or launching a boat. Based on the data 200, other vehicles and devices 148 of FIG. 1, the vehicle 210) may be notified of the locations (e.g., the locations 220-224 at which vehicles are loading or launching boats. For example, vehicle gear data may indicate whether a vehicle shifts from drive to reverse (e.g., to back into the body of water 202 to launch a boat). The use of vehicle programming (e.g., back-up assist modes, etc.) may indicate that a vehicle is loading or launching a boat. Location data may indicate whether a vehicle is loading or launching a boat (e.g., based on whether a vehicle is near the body of water 202). Tow weight of a vehicle may indicate whether a vehicle is loading or launching a boat (e.g., based on whether the boat is being towed by the vehicle). Image data (e.g., from a vehicle camera or other camera) may indicate whether a vehicle is loading or launching a boat (e.g., based on whether captured image data indicates the presence of a boat behind the vehicle, whether the boat is at an inclined angle indicating that the vehicle is backing into water, etc.).

In one or more embodiments, with user consent and in accordance with relevant laws, the remote device 134 may collect data from vehicles 204-210, such as location data, vehicle gear data, vehicle mode data, vehicle image data, vehicle weight data, and the like, to determine whether one or more vehicles are loading or launching boats and at which locations. The remote device 134 may identify boat launching locations based on determinations that vehicles are launching or loading boats and the locations where the data are detected. The remote device 134 may generate map data indicating locations where vehicles may launch and load boats, expected launch and load wait times (e.g., based on the number of vehicles at or near a launch and load location, etc.), and driving directions to a launch and load location (e.g., from the location 230 to any of the locations 220-224).

In one or more embodiments, based on the data 200, the remote device 134 may determine whether a location (e.g., the locations 220-224) is open (e.g., unoccupied) or occupied. For example, when the remote device 134 determines that the locations 220-224 are boat launching or loading locations, the remote device 134 may determine whether any vehicles are at the boat launching or loading locations and/or are on the way to the boat launching or loading locations (e.g., have been provided driving directions to the boat launching or loading locations). For example, when the data 200 indicate that the vehicle 206 is no longer at the location 222 after having determined that the vehicle was launching a boat at the location 222, the remote device 134 may determine that the location 222 is open. While the vehicle 206 is launching a boat at the location 222, however, the remote device 134 may determine that the location 222 is occupied. The remote device 134 may select a launching location that is open or has the shortest wait time (e.g., driving time plus additional time for any vehicle at the location to complete boat launching or loading), as determined by comparing respective wait times for different locations. For example, the remote device 134 may have access to traffic data indicating a commute time from the location 230 to any of the locations 220-224. Any vehicle at a launching location may be associated with an estimated time to complete a boat load or launch (e.g., X minutes per vehicle at the location). The data 200 may indicate the commute and/or wait times, the number of lanes, and/or the number of vehicles currently at any location.

In one or more embodiments, the remote device 134 may identify the location (e.g., GPS location) of boat launches so that when a connected vehicle (e.g., the vehicle 210) is waiting to launch (or load) a boat and the distance from the known ramp (e.g., any of the locations 220, 222, or 224) to the vehicle (as well any other vehicles nearby) may be indicative of an expected waiting time until that vehicle and any other connected vehicles will be able to access the ramp. The location of boat launching may differ over time (e.g., because water levels change), so detecting the water itself and the distance of the host vehicle to the water may also be relevant to the determination of the waiting time (e.g., when the number of vehicles ahead is not known). For example, any of the locations 220, 222, or 224 may change at different times of day or on different days as water levels change, impacting the driving distance to a launching location. In this manner, the data 130 of FIG. 1 may be indicative of water levels (e.g., as captured by images or other inputs).

In one or more embodiments, the remote device 134 may identify multiple vehicles at the same location, indicating a number of loading or launching lanes available at the location (e.g., concurrently available). For example, when the remote device 134 identifies multiple vehicles concurrently loading or launching at the location 222 at one time, but only identifies one vehicle (e.g., the vehicle 206) loading or launching at the location 222 at another time, such may indicate that a lane is available. The remote device 134 may determine peak days and times for launching and loading at any given location based on the data 200 and whether the data 200 indicates loading and launching operations at different times, and involving a number of vehicles. The data 200 also may indicate a water level (e.g., of the body of water 202) as determined by image analysis and/or based on available water level data accessible to the remote device 134. The data 200 may include the peak times to allow the vehicle 210 (e.g., or its driver) to determine the optimal time to launch or load at any location.

In one or more embodiments, the remote device 134 may determine (e.g., using image analysis) or have access to grade (e.g., slope) information to indicate the incline of the terrain for launching or loading a boat at any location. The data 200 may include the grade information to allow a vehicle (e.g., or its driver) to determine how steep the incline may be for launching and loading.

Figure 3:
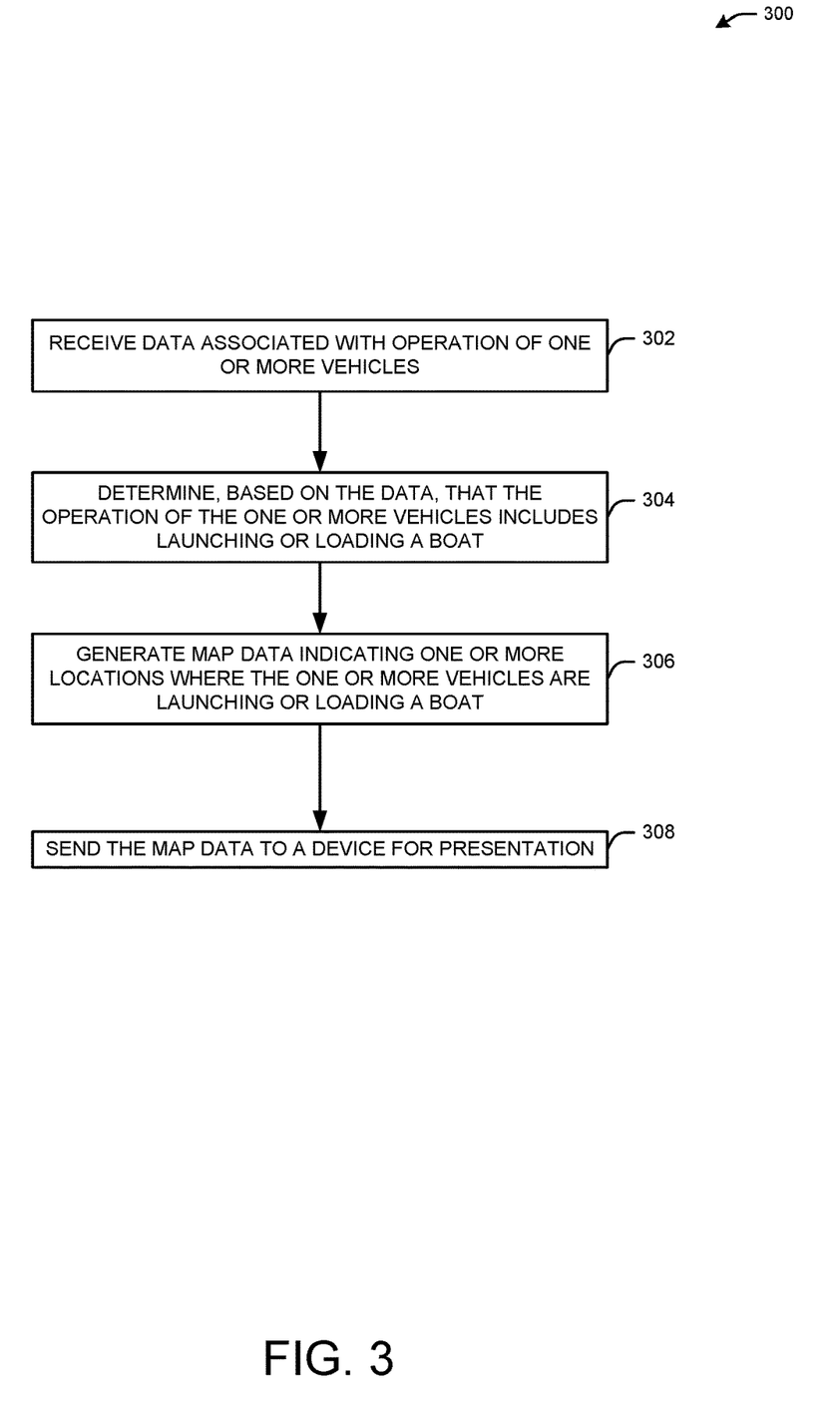
FIG. 3 is a flowchart of an example method for boat launching and loading detection and management.

FIG. 3 is a flowchart of an example method 300 for boat launching and loading detection and management.

At block 302, a system (e.g., the remote device 134 of FIG. 1) may receive data associated with operation of one or more vehicles. For example, the data (e.g., the data 130 of FIG. 1, the data 200 of FIG. 2) may include location data, vehicle gear data, vehicle mode data, vehicle image data, vehicle weight data, and the like, to determine whether one or more vehicles are loading or launching boats and at which locations. The data may indicate whether a vehicle is loading or launching a boat.

At block 302, the system may determine, based on the data, that the operation of the one or more vehicles includes loading or launching a boat. For example, vehicle gear data may indicate whether a vehicle shifts from drive to reverse (e.g., to back into the body of water 202 of FIG. 2 to launch a boat). The use of vehicle programming (e.g., back-up assist modes, etc.) may indicate that a vehicle is loading or launching a boat. Location data may indicate whether a vehicle is loading or launching a boat (e.g., based on whether a vehicle is near the body of water 202). Tow weight of a vehicle may indicate whether a vehicle is loading or launching a boat (e.g., based on whether the boat is being towed by the vehicle). Image data (e.g., from a vehicle camera or other camera) may indicate whether a vehicle is loading or launching a boat (e.g., based on whether captured image data indicates the presence of a boat behind the vehicle, whether the boat is at an inclined angle indicating that the vehicle is backing into water, etc.).

At block 306, the system may generate map data indicating one or more vehicle locations (e.g., the locations 220-224 of FIG. 2) where the one or more vehicles are launching or loading a boat. The system may generate map data indicating locations where vehicles may launch and load boats, expected launch and load wait times (e.g., based on the number of vehicles at or near a launch and load location, etc.), and driving directions to a launch and load location (e.g., from the location 230 to any of the locations 220-224 of FIG. 2). Based on the data 200, the remote device 134 may determine whether a location is open or occupied (e.g., busy, has no open lanes, etc.). The system may select a launching location that is open or has the shortest wait time (e.g., driving time plus additional time for any vehicle at the location to complete boat launching or loading), as determined by comparing respective wait times for different locations. For example, the system may have access to traffic data indicating a commute time from one location to another location. Any vehicle at a launching location may be associated with an estimated time to complete a boat load or launch (e.g., X minutes per vehicle at the location). The map data may indicate the commute and/or wait times, the number of lanes, and/or the number of vehicles currently at any location. The system may determine peak days and times for launching and loading at any given location based on the map data and whether the map data indicates loading and launching operations at different times, and involving a number of vehicles. The map data also may indicate a water level (e.g., of the body of water 202 of FIG. 2) as determined by image analysis and/or based on available water level data accessible to the system. The map data may include the peak times to allow a vehicle (e.g., or its driver) to determine the optimal time to launch or load at any location.

At block 308, the system may send the map data to another device for presentation (e.g., the map data 140 sent to the one or more devices 148 of FIG. 1). The map data may indicate open and/or busy launching and loading lanes, wait times, driving directions, peak launching or loading times, and the like.

The examples above are not meant to be limiting.

Figure 4:
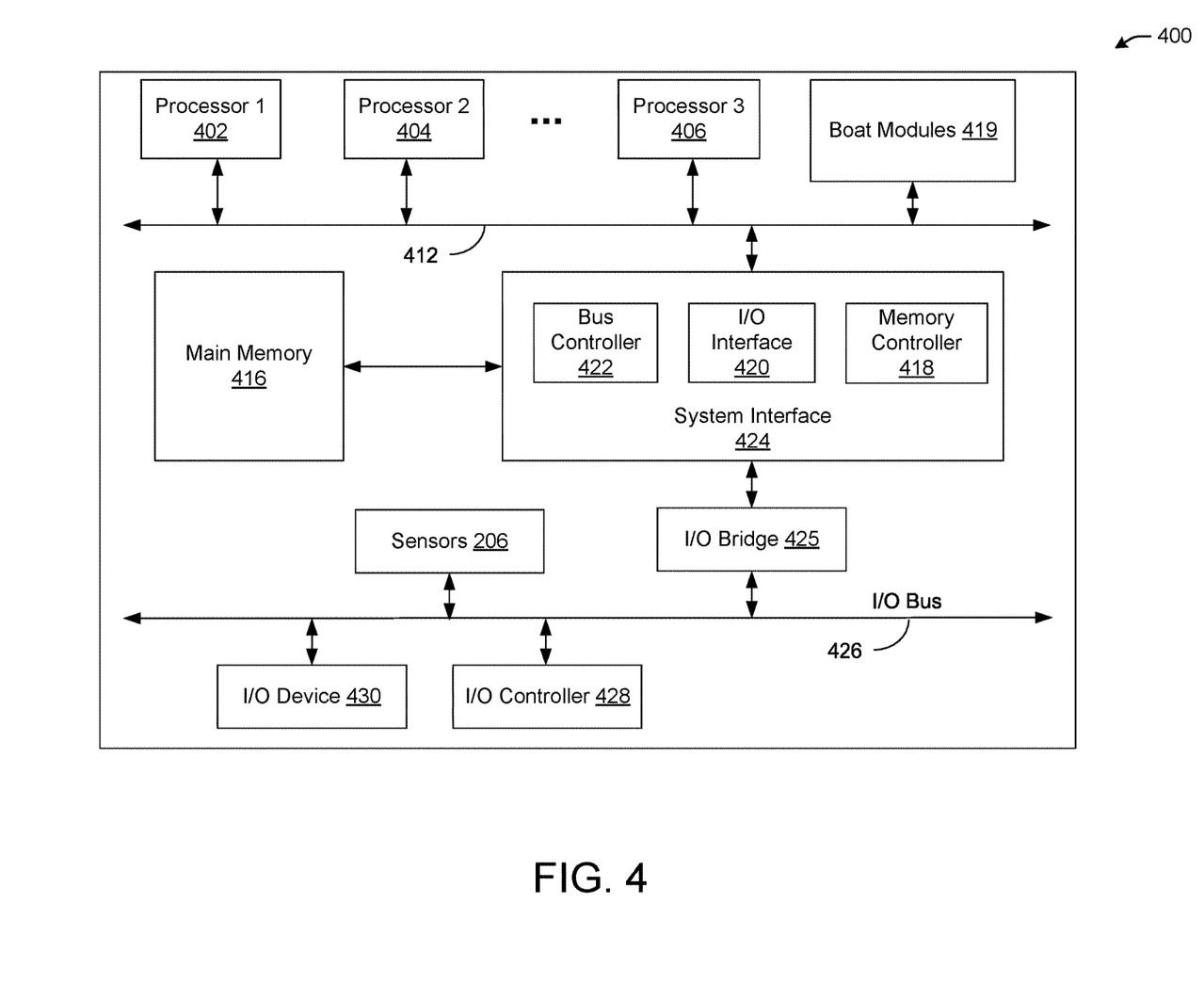
FIG. 4 is a block diagram illustrating an example of a computing device or computer system upon which any of one or more techniques (e.g., methods) may be performed, in accordance with one or more example embodiments of the present disclosure.

FIG. 4 is a block diagram illustrating an example of a computing device or computer system upon which any of one or more techniques (e.g., methods) may be performed, in accordance with one or more example embodiments of the present disclosure.

For example, the computing system 400 of FIG. 4 may include or represent the system 100 of FIG. 1, and/or the remote device 134 of FIG. 1. The computer system (system) includes one or more processors 402-406. Processors 402-406 may include one or more internal levels of cache (not shown) and a bus controller (e.g., bus controller 422) or bus interface (e.g., I/O interface 420) unit to direct interaction with the processor bus 412.

Processor bus 412, also known as the host bus or the front side bus, may be used to couple the processors 402-406 and boat modules 419 (e.g., capable of performing the method 300 of FIG. 3) with the system interface 424. System interface 424 may be connected to the processor bus 412 to interface other components of the system 400 with the processor bus 412. For example, system interface 424 may include a memory controller 418 for interfacing a main memory 416 with the processor bus 412. The main memory 416 typically includes one or more memory cards and a control circuit (not shown). System interface 424 may also include an input/output (I/O) interface 420 to interface one or more I/O bridges 425 or I/O devices 430 with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406, and/or the boat modules 419. Another type of user input device includes cursor control, such as a mouse, a trackball, or cursor direction keys for communicating direction information and command selections to the processors 402-406, and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406 and/or the boat modules 419. Main memory 416 also may be used for storing temporary variables or other intermediate information during execution of instructions by the processors 402-406 and/or the boat modules 419. System 400 may include read-only memory (ROM) and/or other static storage device coupled to the processor bus 412 for storing static information and instructions for the processors 402-406 and/or the boat modules 419. The system outlined in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 and/or the boat modules 419 to perform the process steps described herein. In alternative embodiments, circuitry may be used in place of or in combination with the software instructions. Thus, embodiments of the present disclosure may include both hardware and software components.

According to one embodiment, the processors 402-406 may represent machine learning models. For example, the processors 402-406 may allow for neural networking and/or other machine learning techniques used to perform any of the steps of the method 300 of FIG. 3. For example, the processors 402-406 may include tensor processing units (TPUs) having artificial intelligence application-specific integrated circuits (ASICs), and may facilitate computer vision and other machine learning techniques for image analysis and generation.

In one or more embodiments, the computer system 400 may perform any of the steps of the processes described with respect to FIG. 3.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, solid state devices (SSDs), and the like. The one or more memory devices (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
receiving, by at least one processor of a first device, data associated with operation of a vehicle, wherein the data comprise at least one of image data indicative of a boat, vehicle gear data indicative of a gear shift from drive to reverse, weight data indicative of a physical weight of the boat, or vehicle back-up assist mode data;
determining, by the at least one processor, based on the data, that the operation of the vehicle includes at least one of launching the boat into water using the vehicle or loading the boat onto the vehicle;
generating, by the at least one processor, map data indicative of a location associated with the operation of the vehicle; and
sending, by the at least one processor, the map data to a second device for presentation.

2. The method of claim 1, wherein the data comprise the image data, the method further comprising:
determining that the image data are indicative of the boat, wherein determining the operation of the vehicle includes at least one of launching the boat into water using the vehicle or loading the boat onto the vehicle is based on the image data.

3. The method of claim 1, wherein the data comprise the vehicle gear data, the method further comprising:
determining that the vehicle gear data are indicative of the gear shift from drive to reverse,
wherein determining the operation of the vehicle includes at least one of launching the boat into water using the vehicle or loading the boat onto the vehicle is based on the vehicle gear data.

4. The method of claim 1, wherein the data further comprise location data, the method further comprising:
determining that the location data are indicative of the water,
wherein determining the operation of the vehicle includes at least one of launching the boat into water using the vehicle or loading the boat onto the vehicle is based on the location data.

5. The method of claim 1, wherein the data comprise the weight data, the method further comprising:
determining that the weight data are indicative of a physical weight of the boat,
wherein determining the operation of the vehicle includes at least one of launching the boat into water using the vehicle or loading the boat onto the vehicle is based on the weight data.

6. The method of claim 1, wherein the data comprise the vehicle back-up assist mode data, the method further comprising:
determining that the vehicle back-up assist mode data are indicative of the boat,
wherein determining the operation of the vehicle includes at least one of launching the boat into water using the vehicle or loading the boat onto the vehicle is based on the vehicle back-up assist mode data.

7. The method of claim 1, further comprising:
identifying a second location of a second vehicle; and
determining directions from the second location to the location,
wherein the map data comprises the directions.

8. The method of claim 1, further comprising:
determining a time to complete the operation of the vehicle,
wherein the map data is further indicative of the time to complete the operation of the vehicle.

9. The method of claim 1, further comprising:
receiving second data associated with operation of a second vehicle; and
determining, based on the second data, that the operation of the second vehicle includes at least one of launching a second boat into water using the vehicle or loading the second boat onto the second vehicle,
wherein the map data is further indicative of a second location associated with the operation of the second vehicle.

10. A system comprising memory coupled to at least one processor, the at least one processor configured to:
receive data associated with operation of a vehicle, wherein the data comprise at least one of image data indicative of a boat, vehicle gear data indicative of a gear shift from drive to reverse, weight data indicative of a physical weight of the boat, or vehicle back-up assist mode data;
determine, based on the data, that the operation of the vehicle includes at least one of launching the boat into water using the vehicle or loading the boat onto the vehicle;
generate map data indicative of a location associated with the operation of the vehicle; and
send the map data to a device for presentation.

11. The system of claim 10, wherein the data comprise the image data, and wherein the at least one processor is further configured to:
determine that the image data are indicative of the boat,
wherein to determine the operation of the vehicle includes at least one of launching the boat into water using the vehicle or loading the boat onto the vehicle is based on the image data.

12. The system of claim 10, wherein the data comprise the vehicle gear data, and wherein the at least one processor is further configured to:
determine that the vehicle gear data are indicative of the gear shift from drive to reverse,
wherein to determine the operation of the vehicle includes at least one of launching the boat into water using the vehicle or loading the boat onto the vehicle is based on the vehicle gear data.

13. The system of claim 10, wherein the data further comprise location data, and wherein the at least one processor is further configured to:
determine that the location data are indicative of the water,
wherein to determine the operation of the vehicle includes at least one of launching the boat into water using the vehicle or loading the boat onto the vehicle is based on the location data.

14. The system of claim 10, wherein the data comprise the weight data, and wherein the at least one processor is further configured to:
determine that the weight data are indicative of the physical weight of the boat,
wherein to determine the operation of the vehicle includes at least one of launching the boat into water using the vehicle or loading the boat onto the vehicle is based on the weight data.

15. The system of claim 10, wherein the data comprise the vehicle back-up assist mode data, and wherein the at least one processor is further configured to:
determine that the vehicle back-up assist mode data are indicative of the boat,
wherein to determine the operation of the vehicle includes at least one of launching the boat into water using the vehicle or loading the boat onto the vehicle is based on the vehicle back-up assist mode data.

16. The system of claim 10, wherein the at least one processor is further configured to:
identify a second location of a second vehicle; and
determine directions from the second location to the location,
wherein the map data comprises the directions.

17. The system of claim 10, wherein the at least one processor is further configured to:
determine a time to complete the operation of the vehicle,
wherein the map data is further indicative of the time to complete the operation of the vehicle.

18. A device comprising memory coupled to at least one processor, the at least one processor configured to:
receive first data associated with operation of a first vehicle, wherein the first data comprise at least one of image data indicative of a boat, vehicle gear data indicative of a gear shift from drive to reverse, weight data indicative of a physical weight of the boat, or vehicle back-up assist mode data;
receive second data associated with operation of a second vehicle;
determine, based on the first data, that the operation of the first vehicle includes at least one of launching a first boat into water using the first vehicle or loading the first boat onto the first vehicle;
determine, based on the second data, that the operation of the second vehicle includes at least one of launching a second boat into water using the second vehicle or loading the second boat onto the second vehicle;
generate map data indicative of a first location associated with the operation of the first vehicle and a second location associated with the operation of the second vehicle; and
send the map data to a device for presentation.

19. The device of claim 18, wherein the at least one processor is further configured to:
determine a time to complete the operation of the first vehicle,
wherein the map data is further indicative of the time to complete the operation of the first vehicle.

20. The device of claim 18, wherein the at least one processor is further configured to:
identify a third location of a third vehicle; and
determine directions from the third location to the first location or to the second location,
wherein the map data comprises the directions.

* * * * *